United States Patent [19]

Basile

[11] Patent Number: 4,646,295
[45] Date of Patent: Feb. 24, 1987

[54] FREQUENCY-DIVISION MULTIPLEX COMMUNICATIONS SYSTEM HAVING GROUPED TRANSMITTERS AND RECEIVERS

[75] Inventor: Philip C. Basile, Gloucester County, N.J.

[73] Assignee: RCA Corporation, Princeton, N.J.

[21] Appl. No.: 697,834

[22] Filed: Feb. 4, 1985

[51] Int. Cl.$^4$ .......................... H04J 1/00; H04N 1/00
[52] U.S. Cl. ..................... 370/123; 370/124; 455/3
[58] Field of Search ............ 370/124, 72, 123, 70; 455/3

[56] References Cited

U.S. PATENT DOCUMENTS

| | | | |
|---|---|---|---|
| 2,421,333 | 5/1927 | Katchatouroff et al. | 179/15 |
| 2,634,334 | 4/1953 | Kalb | 179/2.5 |
| 2,721,897 | 10/1955 | Schnechloth | 179/2.5 |
| 3,581,209 | 5/1971 | Zimmerman | 370/124 |
| 3,860,873 | 1/1975 | Ringstad | 370/124 |
| 4,467,293 | 8/1984 | Apel | 333/112 |
| 4,481,626 | 11/1984 | Boggs et al. | 370/85 |

Primary Examiner—Douglas W. Olms
Assistant Examiner—Frank M. Scutch, III
Attorney, Agent, or Firm—Joseph S. Tripoli; Robert L. Troike; C. L. Maginniss

[57] ABSTRACT

A frequency division multiplex communications system groups a plurality of communications terminals such that they are coupled onto the communications bus at a single node. Each terminal comprises a fixed-frequency receiver, a frequency-agile transmitter, or both. Each receiver in the system is tuned to a different carrier frequency. Furthermore, the receivers grouped at each node are tuned to carrier frequencies within narrow frequency bands, typically within 2.5 percent of a center frequency, with no overlap between the frequency bands of the several groups. Using this configuration, only one receiver amplifier, one preselector bandpass filter, and one transmitter low pass harmonic filter are required for the plurality of terminals within the grouping.

7 Claims, 4 Drawing Figures

FREQUENCY-DIVISION MULTIPLEX COMMUNICATIONS SYSTEM HAVING GROUPED TRANSMITTERS AND RECEIVERS

This invention relates generally to frequency division multiplex communications systems and, more particularly, to a system wherein a plurality of transmitters and receivers are grouped so as to be coupled to the main communications bus at a single tap, thereby eliminating the need for many of the common equipments normally located with the individual transmitters and receivers.

BACKGROUND OF THE INVENTION

Local area networks (LAN's) are finding widespread use in businesses, hospitals, ships, aircraft, and the like, to serve their internal and external communications needs. In these systems, digital data and voice messages, as well as radio and television communications, are carried via a cable, or bus, which interconnects all of the sending and receiving terminals in the system.

In a broadband system, a sending terminal modulates a carrier signal with its baseband signal using, as an example, frequency division multiplexing, and transmits the modulated signal onto the bus. A receiving terminal, tuned to the frequency of the carrier signal, detects and demodulates the received signal. In this way, a single cable can carry as many simultaneous messages as there are carrier frequencies.

Each sending terminal and each receiving terminal (and those that both send and receive) are coupled to the cable via a tap. Each tap may typically include two directional couplers of the type described in U.S. Pat. No. 4,467,293, "FERRITE TYPE DIRECTIONAL COUPLER," issued Aug. 21, 1984, to T. R. Apel. The couplers may be connected to the cable to permit communications along its two directions. Such a configuration is discussed in U.S. patent application Ser. No. 685,124, entitled "LOCAL AREA NETWORK SYSTEM WITH CONSTANT TAP LEVEL," filed Dec. 24, 1984, for P. C. Basile et al.

In a typical LAN installation, the cable is laid under the flooring or in the ceiling or both. In addition, such an installation may include several senders, receivers and sender/receivers mounted in equipment racks at each location. In conventional systems, each sending and receiving station is coupled to the bus using a separate wire and cable tap, although sender/receivers usually combine their signals using combiners and splitters, as taught in the aforementioned Basile et al. reference, so that they are tied to the bus via a single tap.

In the typical system each receiver includes a preselector bandpass filter, which rejects image interference and prevents local oscillator leakage onto the bus, and a transmit/receive amplifier. Each transmitting terminal includes a low pass filter to prevent harmonics of the carrier signal frequency from entering onto the bus, since the product of harmonics, when intermixed on the bus, give inband spurious signals. Where there are several collocated receiving and transmitting terminals, it would be desirable to combine them into a grouping that would reduce the duplication of common equipment, such as preselector bandpass filters, receive amplifiers, low pass harmonic filters and cable taps. Such a grouping must, however, still permit communications among the terminals within the grouping at signal power levels compatable with intergroup communications.

SUMMARY OF THE INVENTION

In accordance with the principles of the present invention, a communications system comprising a multiplicity of communications terminals is disclosed. The terminals include receive-only terminals having receivers, send-only terminals having transmitters, and transceivers having both a transmitter and a receiver. The system further includes a bus to which the terminals are coupled for purposes of intercommunication. The multiplicity of terminals are partitioned into groups, each of the groups comprising a plurality of receivers each fixedly tuned to receive signals modulating a single, different carrier frequency. All of the carrier frequencies to which the plurality of receivers are tuned are closely spaced within a narrow frequency band. This narrow frequency band is exclusive among all of the groups. Each group also includes a plurality of transmitters for transmitting signals on a carrier frequency. Each of the plurality of transmitters is adapted to transmit on all of the carrier frequencies within all of the narrow frequency bands of the system. Each group additionally includes means for combining the output signals of the plurality of transmitters and a first filter coupled to the combining means for passing only those signals having a carrier frequency not substantially higher than the highest carrier frequency transmitted by the transmitters. Each group also includes means for coupling the signals passed by the first filter to the bus and for receiving signals transmitted along the bus. Each group further includes a second filter coupled to the coupling means for passing only those signals received from the bus having carrier frequencies not substantially outside the narrow frequency band. Finally, each group includes means for coupling the signals passed by the second filter to each of the plurality of receivers.

DETAILED DESCRIPTION OF THE PREFERRED EMBODIMENT

Figure 1:
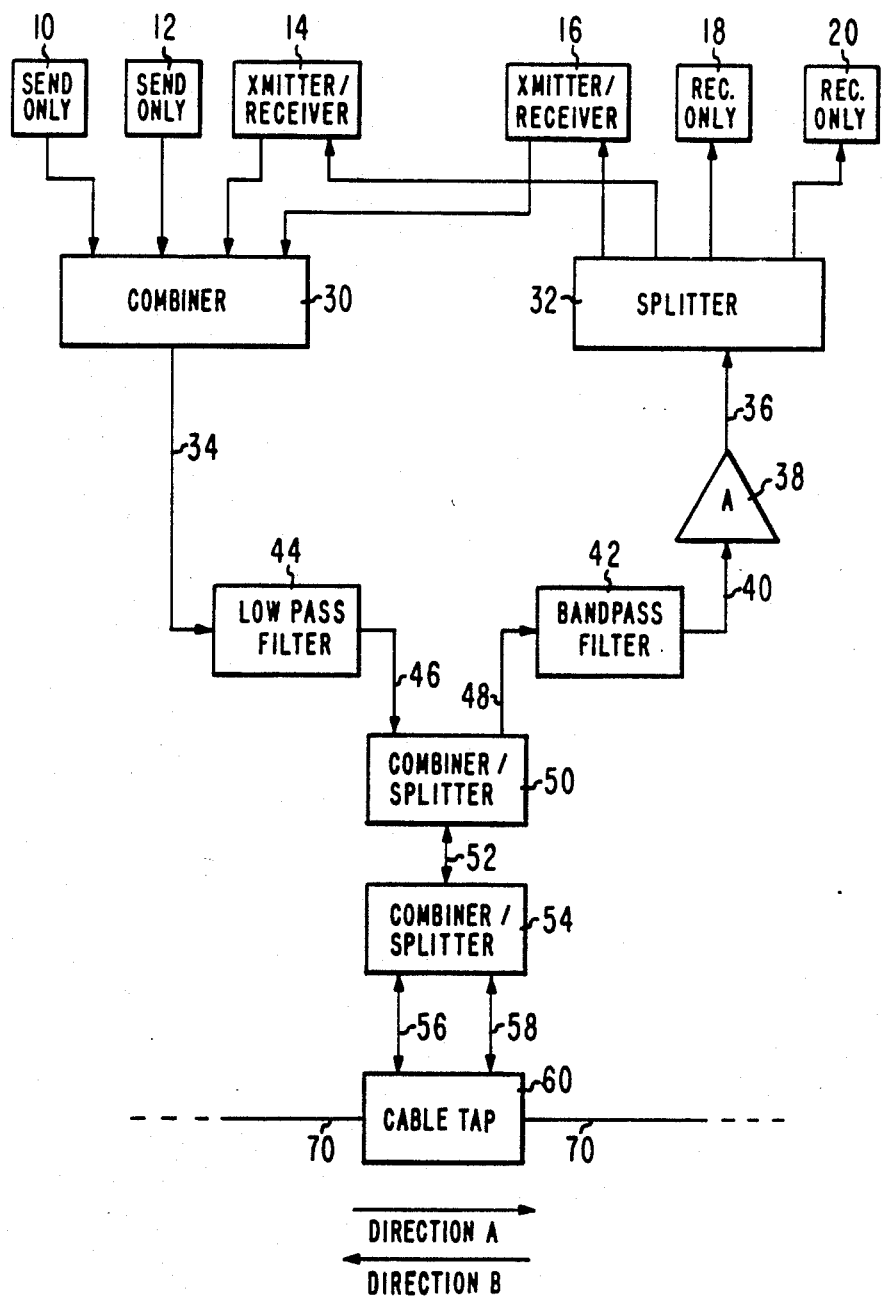
FIG. 1 is a block diagram of one grouping of transmitters and receivers according to the present invention.

Referring to FIG. 1, a plurality of communications terminals, illustratively including send-only terminals 10 and 12, receive-only terminals 18 and 20, and send/receive terminals 14 and 16, are grouped and coupled via a single cable tap 60 onto communications bus 70 for the purpose of communications. Send-only terminals 10 and 12 may comprise, for example, radio transmitters, computer keyboards, digital modulators, etc.; receive-only terminals 18 and 20 may comprise, for example, radio receivers, video monitors, printers, digital demodulators, etc.; and send/receive terminals 14 and 16 may comprise, for example, radio transceivers, telephones, modems, etc.

The output signals of send-only terminals 10 and 12 and the transmit output signals of send/receive terminals 14 and 16 are combined onto a single signal lead 34 by combiner 30. The signal on lead 34 is applied to low pass harmonic filter 44 which is selected to pass all fundamental carrier frequencies generated by transmitting terminals 10, 12, 14 and 16. The output signal of filter 44 is passed via signal lead 46 to combiner/splitter 50, which functions in this case as a combiner, coupling the signal on lead 46 to signal lead 52. Combiner/splitter 54, which functions in this case as a splitter, receives the signal on lead 52 and couples it to both signal leads 56 and 58. The signals carried on leads 56 and 58 are coupled to cable tap 60 which is shown, in a preferred embodiment, in FIG. 2.

Cable tap 60 comprises two directional couplers 62 and 64. Directional couplers are well known in the art as devices which couple signals traveling in one direction only to a secondary system, while virtually ignoring a signal traveling in the opposite direction. The amount of coupling is ordinarily expressed in decibels of attenuation that the signal undergoes in passing through the coupling to the secondary system.

In a preferred embodiment of the present invention, one might select a directional coupler such as Model No. PDC-10-1, sold by Mini-Circuits Division of Scientific Components Corp. of Brooklyn, N.Y. This model includes a plurality of toroidal windings for sensing current and voltage, and operates over a frequency range of 0.5 to 500 MHz. Alternatively, one might use a directional coupler of the type described in the aforementioned Apel patent.

In the present example, directional couplers 62 and 64 are substantially identical devices, but configured such as to receive oppositely-directed signals transmitted along cable 70. Coupler 62 passes signal along cable 70, the primary transmission system (path 62a), with very little attenuation, typically one-half decibel. Coupler 62 also permits communications between terminals 10 through 20 and terminals whose cable taps are disposed along cable 70 in direction B (toward the left) with relatively small attenuation along path 62b, typically 10 db. However, coupler 62 effectively blocks communications between terminals 10 through 20 and terminals whose cable taps are disposed along cable 70 in direction A (toward the right), by exhibiting large attenuation along path 62c (shown as a dashed line), typically 50 db.

In a similar, but essentially opposite manner, directional coupler 64 passes signal along cable 70 (path 64a) with very little attenuation, typically one-half db. Coupler 64 also permits communications between terminals 10 through 20 and terminals whose taps are disposed along cable 70 in direction A with relatively small attenuation along path 64b, typically 10 db. However, coupler 64 effectively blocks communications between terminals 10 through 20 and terminals whose taps are disposed along cable 70 in direction B, by exhibiting large attenuation along path 64c (shown as a dashed line), typically 50 db.

A signal transmitted along cable 70 in direction A is received by tap 60 via directional coupler 62 where it passes via signal lead 56 to device 54. A signal transmitted along cable 70 in direction B is received by tap 60 via directional coupler 64 where it passes via signal lead 58 to device 54. In this instance, device 54 acts as a combiner, combining the signals on signal leads 56 and 58 onto a single lead 52. Device 50, acting in this instance as a splitter, receives the combined signal on lead 52 and splits the part received from cable 70 onto signal lead 48 where it is applied to preselector bandpass filter 42, which is selected to pass only a narrow band of carrier frequencies. The output signal of filter 42 is applied to receive amplifier 38 via lead 40. The amplified signal is applied to splitter 32 via signal lead 36. Splitter 32 couples the signal on lead 36 to the receive portions of send/receive terminals 14 and 16 and to receive-only terminals 18 and 20.

It should be noted that each of the directional couplers 62 and 64 presents a loss of approximately one-half db to signals passing along cable 70. Thus, the insertion loss of tap 60 may be said to be approximately one db.

A system including the grouping of FIG. 1 may illustratively operate within a band of carrier frequencies between 225 and 400 MHz. In this example, each of the transmitting terminals, i.e., send-only terminals 10 and 12 and the transmit portions of send/receive terminals 14 and 16, are frequency agile, in that they are capable of generating any carrier frequency used within the system. Low pass harmonic filter 44 passes all signals up to 400 MHz and its response falls off sharply above that frequency to prevent harmonics of the carrier frequencies from entering upon the bus. This is important as the products of harmonics, when intermixed on the bus, may give spurious signals within the system frequency band.

Whereas the transmitting terminals of the system of FIG. 1 are frequency agile, the receiving terminals, i.e., receive-only terminals 18 and 20 and the receive portions of send/receive terminals 14 and 16, are fixed in frequency. Each is tuned to receive but a single carrier frequency. Further, each receiving terminal within a grouping, those coupled to splitter 32 in the present example, is frequency-tuned within a narrow band of frequencies, e.g., within 2.5 percent of a center frequency. By way of illustration, the receive portions of terminals 14 and 16 and receive-only terminals 18 and 20 may be respectively tuned to four different carrier frequencies within the band of 292.5 to 307.5 MHz, which band comprises frequencies within 2.5 percent of a center frequency of 300 MHz. Each grouping of receivers within a system of the type including the grouping of FIG. 1 is tuned to a different center frequency, and there is no overlap within their respective frequency bands.

Preselector filter 42 is chosen to pass only the narrow band of frequencies to which its associated receivers are tuned. By providing filter 42 with a narrow pass band in this manner, the images of the carrier signals are rejected and, in addition, there can be no leakage of the first local oscillator of each receiver back onto bus 70. In the system of the present example, an intermediate frequency used for all receivers may typically be 70 MHz. Thus, for a carrier frequency of 300 MHz, a local oscillator having a frequency of 370 MHz would be required. Filter 42 rejects the image frequency signal at 440 MHz, and additionally blocks the leakage of the 370 MHz local oscillator signal.

The fixed-frequency grouping of the receivers into a narrow band of frequencies has a beneficial impact on the selection of receive amplifier 38. Amplifiers which are required to provide a linear response only over a narrow frequency band are readily available and relatively inexpensive, in comparison to broadband amplifiers.

Figure 2:
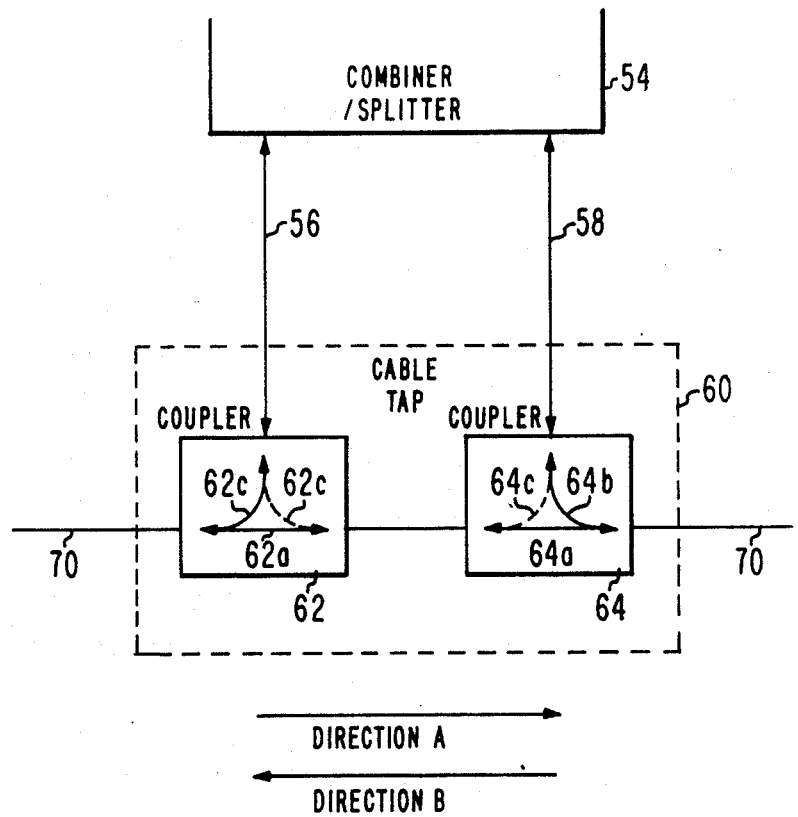
FIG. 2 is a block diagram showing one embodiment of the cable tap of FIG. 1 in greater detail.
Figure 3:
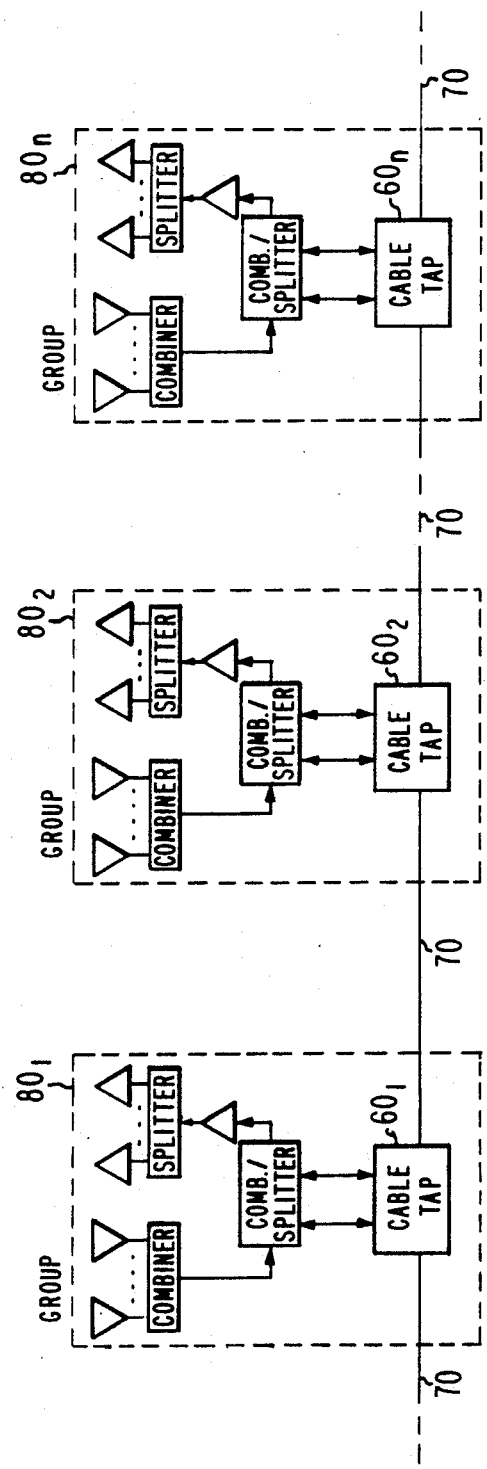
FIG. 3 is a block diagram of a system including groupings of the type shown in detail in FIG. 1.

Referring to FIG. 3, there is shown a block diagram of a communications system including groups of elements $80_1$, $80_2$, $80_n$ (designated singly as $80_j$), coupled to bus 70 by taps $60_1$, $60_2$, $60_n$ (designated singly as $60_j$), respectively, where each group $80_i$ is of the type shown in FIG. 1 and where each bus tap $60_i$ is of the type shown in FIGS. 1 and 2. Each receiver in the system of FIG. 3 is tuned to a different carrier frequency. Furthermore, the plurality of receivers within each group are tuned to carrier frequencies within narrow frequency bands, typically within 2.5 percent of a center frequency, with no overlap between the bands of the several groups $80_i$.

Figure 4:
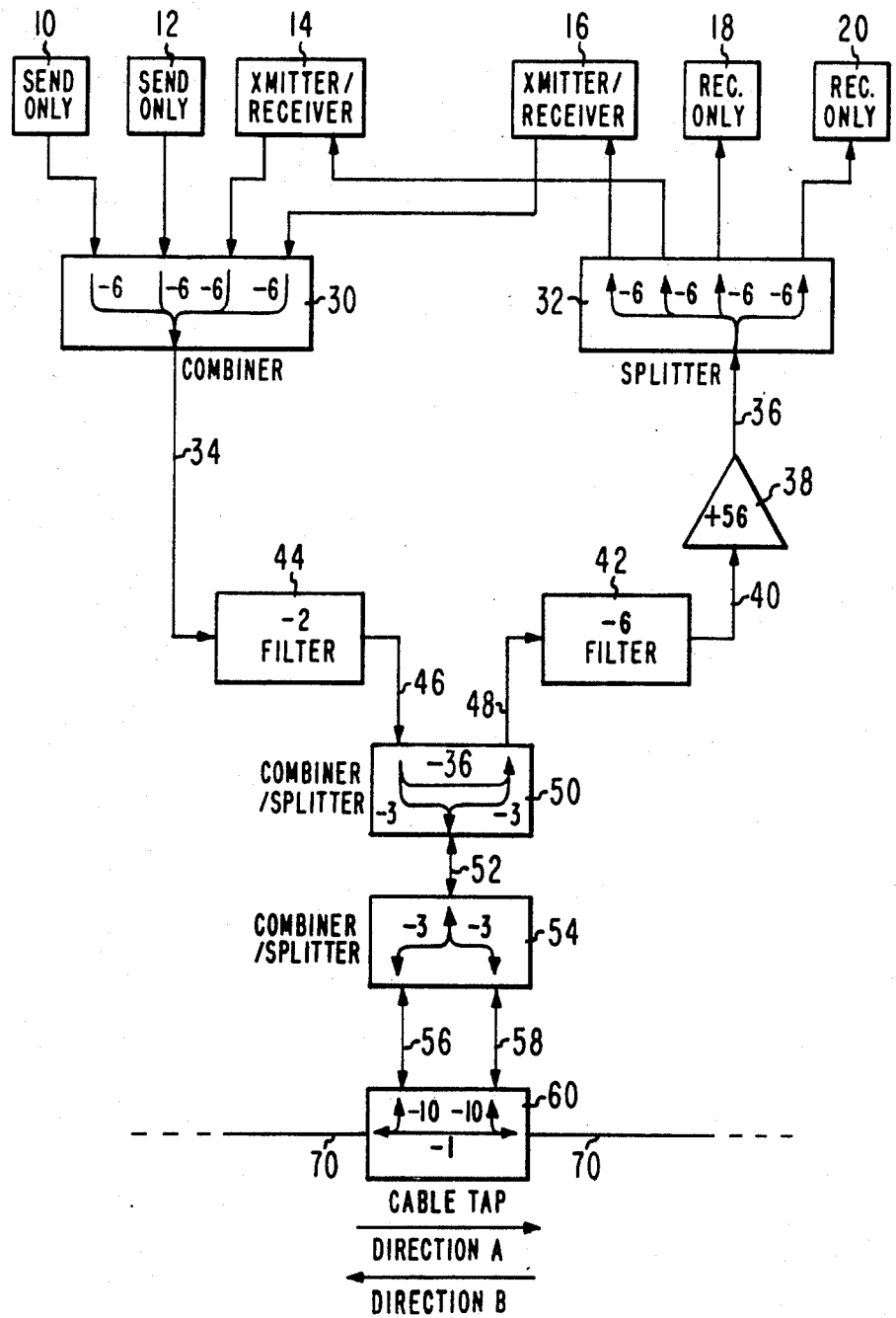
FIG. 4 illustrates the elements of FIG. 1 further providing typical values of signal power loss or gain therethrough.

It will now be demonstrated that the grouping arrangement shown in FIG. 1 permits intragroup communications at signal power levels not substantially different from those of intergroup communications. FIG. 4 illustrates the grouping of FIG. 1 including typical values of signal power level attenuation and amplification (expressed in decibels) for the several elements of the system. Combiner 30 provides a loss of 6 db between its four input ports and its output port coupled to lead 34. Filter 44 provides a loss of 2 db between leads 34 and 46 within its passband. Combiner/splitter 50 provides a loss of 3 db between leads 46 and 52 and between leads 52 and 48, but it provides a loss of 36 db between leads 46 and 48. Combiner/splitter 54 provides a loss of 3 db between leads 52 and 56 and between leads 52 and 58. Filter 42 provides a loss of 6 db between leads 48 and 40 within its passband. Amplifier 38 provides a gain of 56 db between leads 40 and 36. Finally, splitter 32 provides a loss of 6 db between lead 36 and any of its output ports. The losses through cable tap 60 were enumerated within the earlier discussion relating to FIG. 2.

Considering first an intragroup connection, e.g., between terminals 10 and 20, the combined loss through devices 30, 44, 50 (−36 db path), 42 and 32, is 56 db, which is entirely offset by the 56 db gain in amplifier 38, for a net gain (loss) of 0 db. Considering next an intergroup communication between terminals within groups associated with cable taps adjacently located along cable 70, the combined loss through devices 30, 44, 50 (−3 db path twice), 54 (twice), 60 (−10 db path twice), 42 and 32, is 52 db. This is offset by the gain through amplifier 38 of 56 db for a net gain of 4 db, which is not substantially different from the 0 db gain demonstrated for the intragroup connection.

Finally, considering an intergroup communication between terminals within groups separated along cable 70 by six intervening cable taps of a type similar in characteristics to cable tap 60, the combined loss through devices 30, 44, 50 (−3 db path twice), 54 (twice), 60 (−10 db path twice and the −1 db path six times), 42 and 32, is 58 db. This is offset by the gain through amplifier 38 of 56 db for a net loss of 2 db, which is also not substantially different from the 0 db gain demonstrated for the intragroup connection.

It has therefore been shown that by combining groups of transmitting and receiving terminals within a frequency division multiplexed local area network substantially as related in the foregoing description, it is possible to reduce the duplication of common equipments such as preselector bandpass filters, receive amplifiers, low pass harmonic filters and cable taps. It has further been shown that such a grouping permits intragroup and intergroup communications at signal power levels which are not substantially different.

While the principles of the present invention have been demonstrated with particular regard to the illustrated structure of the figures, it will be recognized that various departures from such illustrative structure may be undertaken in the practice of the invention. The scope of this invention is not intended to be limited to the structure disclosed herein but should instead be gauged by the breadth of the claims which follow.

What is claimed is:

1. A communications system comprising a multiplicity of communications terminals, said terminals including receive-only terminals having receivers, send-only terminals having transmitters, and transceivers having both a transmitter and a receiver; and a bus to which said terminals are coupled for purposes of intercommunication; wherein said multiplicity of terminals are partitioned into a plurality of groups, each of said groups comprising:
   a plurality of fixed frequency receivers each tuned to receive signals modulating a single, different carrier frequency, wherein all of the carrier frequencies to which said plurality of receivers are tuned are closely spaced within a narrow frequency band, said narrow frequency band being exclusive among all of said groups;
   a plurality of transmitters for transmitting signals on a carrier frequency, each of said plurality of transmitters adapted to transmit on all of the carrier frequencies within all of said narrow frequency bands of said system;
   first combining means for combining the output signals of said plurality of transmitters;
   a first filter coupled to said first combining means for passing only those signals having a carrier frequency not substantially higher than the highest carrier frequency transmitted by said transmitters;
   means for coupling the signals passed by said first filter to said bus and for receiving signals transmitted along said bus;
   a second filter coupled to said coupling means for passing only those signals received from said bus having carrier frequencies not substantially outside said narrow frequency band; and
   means for coupling the signals passed by said second filter to each of said plurality of receivers.

2. The system according to claim 1 wherein each of said plurality of receivers within said group is tuned to receive a carrier signal having frequency which is within approximately 2.5 percent of a center frequency of said narrow frequency band of said group.

3. The system according to claim 1 further including an amplifier coupled between said second filter and said second-mentioned coupling means.

4. The system according to claim 1 wherein said first-mentioned coupling means includes a bus tap, said bus tap comprising first and second directional couplers, said first directional coupler for coupling said plurality of receivers and said plurality of transmitters with communications terminals coupled to bus taps disposed along said bus in a first direction, said second directional coupler for coupling said plurality of receivers and said plurality of transmitters with communications terminals coupled to bus taps disposed along said bus in a second direction.

5. The system according to claim 4 wherein said first-mentioned coupling means further includes second combining means for combining the signals coupled by said first and second directional couplers respectively along said first and second directions of said cable.

6. The system according to claim 5 wherein said first-mentioned coupling means further includes third combining means for combining the signals passed by said first filter with the signals received from said bus.

7. The system according to claim 6 wherein said third combining means includes means for coupling the signals passed by said first filter to said second filter.

* * * * *